United States Patent Office 3,311,601
Patented Mar. 28, 1967

3,311,601
PROCESS COAGULATING CHLOROPRENE POLYMERS FROM A LATEX
James Batts Conley, Memphis, Ind., assignor to E. I. du Pont de Nemours and Company, Wilmington, Del., a corporation of Delaware
No Drawing. Filed Aug. 2, 1963, Ser. No. 299,667
7 Claims. (Cl. 260—92.3)

This invention relates to the isolation of elastomers from their latices and, more particularly, to an improvement in the usual method for isolating such polymers by freezing in thin layers and then washing and drying the resulting film, particularly when the elastomer is brittle at the temperature used for freezing.

One convenient and generally-used method for isolating elastomers from their aqueous dispersions (latices) is to freeze a layer of the latex on a rotating, refrigerated drum, continuously remove the resulting strip consisting of ice and a network of coagulated elastomer, warm and wash with water on a continuous screen to melt the ice and wash out from the elastomer the dispersing agents and other soluble electrolytes present from the latex and finally to dry the continuous strips of elastomer. This method is described by Calcott and Starkweather in U.S. Patent 2,187,146. In order to pass continuously through these successive operations, the elastomer in the various forms in which it is present must at all times remain in a continuous strip having considerable strength, particularly at the low freezing temperatures (e.g., about —10° C.) employed.

Although polychloroprenes and many other elastomers are effectively isolated by this method, certain copolymers of chloroprene are brittle at these low temperatures and tend to crack when the curved frozen layer formed on the drum is bent into a flat strip when removed from the drum and transferred to the screens on which it is further treated. When the cracks formed are extensive, the strip may break completely. This is serious even when it occurs only very occasionally, since the entire operation must then be stopped until the passage of a continuous strip throughout the whole system can again be established. If it occurs frequently, this highly desirable method of isolation of the polymer cannot be used at all. It is obviously important to provide a method whereby these elastomers which are somewhat brittle under process conditions at low temperatures may be handled without difficulty in the equipment used for the polychloroprenes.

It has unexpectedly been found that even chloroprene polymers which exhibit low temperature brittleness can be isolated by the process which comprises freezing a layer of an aqueous latex emulsion on a rotating drum surface, e.g., cooled to —5 to —30° C., removing the resulting frozen layer from said drum, thawing to melt the ice and washing and drying the coagulated polymer which results, providing the improvement of this invention is employed which consists in incorporating in said latex emulsion before freezing from about 1 to 20 parts by weight, per 100 parts of polymer, of a volatile liquid selected from the group consisting of aromatic hydrocarbons, ketones and nitriles, said volatile liquid having a boiling point in the range of from about 56° to 150° C.

The phrase "chloroprene polymers which exhibit low temperature brittleness" refers to those polymers of chloroprene which tend to crack when a thin frozen layer of the latex is bent at low temperatures, e.g., about —10° C. While many polychloroprenes (homopolymers of chloroprene) do not generally exhibit such low temperature brittleness, many copolymers of chloroprene do. Representative examples of such are chloroprene polymers containing comonomers such as acrylonitrile or 2,3-dichlorobutadiene-1,3. Specifically mentioned are: copolymers of chloroprene containing about 20% of acrylonitrile, made at about 40° C.; copolymers of chloroprene containing from about 60 to 75% of 2,3-dichlorobutadiene-1,3, made at 40° C.; and copolymers of chloroprene containing about 60% 2,3-dichlorobutadiene-1,3, made at 10° C. It is to be understood, however, that the exact composition of the chloroprene polymer is not critical and that the improvement hereindescribed can be realized with a broad range of polymers exhibiting low temperature brittleness. It should also be borne in mind, however, that copolymers exhibiting low temperature brittleness in latex form as defined above are not usually brittle at these low temperatures when isolated and properly compounded and cured.

The aqueous latex emulsion of chloroprene polymer employed in the process may be made by many processes known to those skilled in the art, e.g., processes disclosed in U.S. Patents 2,187,146, 2,227,517, and 2,259,122. Common to all processes for preparing chloroprene polymer latices the latter are subjected to treatment to remove (and recover) unreacted monomer, e.g., distillation, steam treatment, or the like. In any event, the latex employed in the subject process is essentially free of volatile organic liquids before use.

The volatile liquid incorporated in the latex directly before freezing is believed to act as a temporary plasticizer for the elastomeric copolymer, reducing its brittleness at freezing temperatures and later evaporating from the elastomer along with the water during the drying operation. The volatile liquid employed is unsubstituted except by hydrocarbon radicals and should boil below 150° C. at atmospheric pressure, preferably between about 56° and 110° C. The volatile liquid will have a boiling point not lower than 56° C., the boiling point of acetone, the lowest boiling member of the three classes named. Preferred liquids belonging to the classes named are benzene, toluene, xylene, acetone, methyl ethyl ketone, and acrylonitrile, as illustrated by the examples. Except for xylene, these boil between 56 and 110° C. and include the lowest boiling member of each class. Further examples of the ketones included are methyl vinyl ketone, diethyl ketone, methyl normal propyl ketone, methyl isopropyl ketone, diisopropyl ketone, and methyl butyl ketone (2-hexanon). Examples of the nitriles are acetonitrile, propionitrile, normal butyronitrile, isobutyronitrile, crotononitrile, and valeronitrile. Other aromatic hydrocarbons include ethyl benzene and styrene. The amounts used depend somewhat upon the polymer to be isolated, the temperature to which the frozen latex is cooled, and the degree of security from cracking troubles desired. Thus, as illustrated for various copolymers 2,3 - dichlorobutadiene - 1,3 in Examples VII to X, as the dichlorobutadiene content increases, and also as the temperature of polymerization decreases, more toluene is needed for best results. In general, too, more volatile liquid "plasticizer" is desirable when lower freezing temperatures are used. No advantage is gained by using more "plasticizer" than is required to assure operation without cracking, since excess merely adds to the cost of materials and may introduce fire and toxicity problems. Although as little as 1% gives useful results and 20% may sometimes be desirable, from about 1.5 to 12% is ordinarily preferred. The preferred volatile liquid plasticizer is toluene because of its effectiveness, cheapness and safety; however, xylene, even though it boils above 110° C., is advantageous. The volatile liquid plasticizer is usually separately dispersed in water containing an emulsifying agent before addition to the latex. It is also practical to disperse it directly in the latex, with agitation. The plasticizing liquid is preferably added before acidification but may be added after.

The invention will now be described with reference to the following examples of preferred embodiments thereof wherein parts and percentages are by weight unless otherwise specified.

*Example I*

The elastomer to be isolated is a copolymer containing 80% chloroprene and 20% acrylonitrile. It is made in alkaline emulsion by a process based on the addition of part of the chloroprene at the start and part during the course of the polymerization at a rate such as to maintain an approximately constant ratio of chloroprene monomer to acrylonitrile monomer as described in Wagner, U.S. Patent 2,395,649. The emulsifying agent is a mixture of the potassium salts of oleic and disproportionated rosin acids. After stopping the polymerization and stabilizing the product by adding phenothiazine and para-tertiarybutylcatechol, the unused monomers are completely removed by distillation at reduced pressure as described in Morrow et al., U.S. Patent 2,467,769. The resulting latex contains about 45% solids.

The elastomeric chloroprene copolymer is then isolated from this latex according to the present invention, as follows: Three parts by weight of toluene, based on the weight of the latex (6.7% based on the copolymer) is dispersed in a soap solution like that used for emulsifying the monomers and is then added to the latex. This is then acidified to pH 6.4 by adding dilute acetic acid containing the sodium salt of mixed dinaphthylmethane sulfonic acids. The latter prevent the coagulation of the latex when the potassium soap dispersing agents are converted into the corresponding insoluble free acids on acidifying.

The resulting slightly acidic latex containing dispersed toluene is then coagulated continuously as described in U.S. Patent 2,187,146 referred to above by rotating a hollow drum internally cooled to about −10° C. partly immersed in a pool of the latex (with axis of the drum parallel to the latex level) so that a uniform thin layer of frozen latex is grown thereon while in contact with the latex. This layer is kept further at low temperature while the cylinder rotates and is removed therefrom before re-entering the latex pool by means of knife making an angle of about 45° with the surface of the cylinder along its whole width. At this critical point the frozen film on the cylinder develops no cracks as it is bent flat and transferred to a series of moving screens for melting and washing nor does it break as it undergoes the moderate stretching involved in these operations or in passing in festoons through a drying chamber.

If, on the other hand, all the above operations are repeated except that no toluene is added, the frozen latex layer cracks as it is being removed from the drum and breaks completely so that it cannot be continuously transferred to the screens on which the further operations are carried out. Hence, it cannot be processed in the continuous equipment used for other chloroprene polymers.

*Examples II through VI*

In the following Examples II through VI, the procedure of Example I is repeated using the other volatile materials in place of toluene, in the amounts indicated. This and other information is given in the following Table I. The latex frozen is the same except that the polymer content is 35%.

TABLE I

| Example No. | Added Material | Amount (Percent of Polymer) | Results |
|---|---|---|---|
| II | Benzene | 10 | Satisfactory. |
| III | Xylene | 10 | Do. |
| IV | Methyl ethyl ketone | 10 | Do. |
| V | Acetone | 10 | Do. |
| VI | Acrylonitrile | 10 | Do. |

Thus, each of the materials added, representing the three classes recited in the definition of the invention, prevent cracking of the frozen layer in the same way as demonstrated for toluene in Example I.

*Examples VII through X*

The application of the present invention to copolymers of chloroprene and 2,3-dichlorobutadiene-1,3, containing about 65 to 80% of the latter, is shown in Examples VII through X, described below and in the following Table II. The copolymers are made in alkaline emulsion containing the sodium salt of the acids of wood rosin as emulsifying agent and isopropyl xanthogen disulfide as modifying agent, at the temperatures given in the table. When 70% of the total monomer content has been polymerized, further polymerization is short-stopped and the unused monomers are completely removed by vacuum distillation. The dispersion is treated with the amount of toluene given in the table, then acidified in the presence of the sodium salt of mixed naphthylmethane sulfonic acids, and coagulated by freezing at about −10° C., the entire series of operations, beginning with the short-stopping of the polymerization, being substantially the same, except as noted in Table II, being as those carried out in Example I. The polymer content of the latex frozen is 35%.

TABLE II

| Example | 2,3-dichlorobutadiene in product, percent | Temp. of polymer, ° C. | Toluene added, percent | Results |
|---|---|---|---|---|
| VII | 65 | 40 | 4.5 | Satisfactory. |
| VIII | 65 | 10 | 7.5 | Do. |
| IX | 75 | 40 | 6 | Do. |
| X | 80 | 40 | 12 | Do. |

The improvement realized by this invention now enables a highly desirable method for the isolation of elastomers to be utilized for the isolation of chloroprene polymers exhibiting low temperature brittleness. Such an improvement is a great advantage in the production of copolymers of chloroprene.

What is claimed is:

1. In a process for the isolation of chloroprene polymer, which polymer exhibits low temperature brittleness, which process comprises freezing a layer of an aqueous latex emulsion of said polymer on a rotating drum surface, removing the resulting frozen layer from said drum, thawing to melt the ice and washing and drying the thin layer of coagulated polymer which results; the improvement of incorporating in said latex emulsion before freezing from about 1 to 20 parts by weight, per 100 parts of polymer, of a volatile liquid selected from the group consisting of aromatic hydrocarbons, ketones, and nitriles, said volatile liquid having a boiling point in the range of from about 56° C. to 150° C.

2. A process as defined in claim 1 wherein said drum surface is cooled to a temperature of from about −5° to −30° C.

3. A process as defined in claim 1 wherein said volatile liquid has a boiling point in the range of from about 56° to 110° C.

4. A process as defined in claim 1 wherein the amount of said volatile liquid ranges from about 1.5 to 12 parts, per 100 parts of polymer.

5. A process as defined in claim 1 wherein said aromatic hydrocarbon is selected from the group consisting of benzene, toluene and xylene.

6. A process as defined in claim 1 wherein said ketone is selected from the group consisting of acetone and methyl ethyl ketone.

7. A process as defined in claim 1 wherein said nitrile is acrylonitrile.

References Cited by the Examiner
UNITED STATES PATENTS 2,187,146  1/1940  Calcott et al. _____ 260—92.3

JOSEPH L. SCHOFER, *Primary Examiner.*

H. I. CANTOR, *Assistant Examiner.*